(12) United States Patent
Pycko

(10) Patent No.: US 9,241,070 B1
(45) Date of Patent: Jan. 19, 2016

(54) PROVIDING COMPLIANCE ENFORCEMENT FOR MANUALLY DIALED WIRELESS NUMBERS IN A CONTACT CENTER USING CALLBACK FUNCTIONALITY

(71) Applicant: Noble Systems Corporation, Atlanta, GA (US)

(72) Inventor: Marcin Pycko, Madison, AL (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 44 days.

(21) Appl. No.: 14/091,778

(22) Filed: Nov. 27, 2013

(51) Int. Cl.
*H04M 3/51* (2006.01)
*H04M 1/2745* (2006.01)

(52) U.S. Cl.
CPC ...... *H04M 3/5158* (2013.01); *H04M 1/274575* (2013.01)

(58) Field of Classification Search
CPC ... H04M 3/5158; H04M 3/5183; H04M 3/51; H04M 3/42365
USPC .............. 379/266.07, 265.02, 207.15, 266.08
See application file for complete search history.

(56) References Cited

U.S. PATENT DOCUMENTS

| | | | |
|---|---|---|---|
| 8,358,771 B1 * | 1/2013 | Moore et al. | 379/265.01 |
| 8,503,637 B1 * | 8/2013 | Kirchhoff et al. | 379/142.02 |
| 8,588,401 B2 * | 11/2013 | Zgardovski et al. | 379/266.08 |
| 8,606,245 B1 * | 12/2013 | Eccelston et al. | 455/414.1 |
| 2006/0126818 A1 * | 6/2006 | Berger et al. | 379/265.09 |
| 2012/0088475 A1 * | 4/2012 | Portman et al. | 455/412.1 |
| 2013/0202101 A1 * | 8/2013 | LaBoyteaux et al. | 379/265.02 |

OTHER PUBLICATIONS

Noble Systems Corporation, Maestro 2010.1.1 Manual, vol. 4: IVR, Oct. 27, 2010, pp. 1-318, Noble Systems Corporation, Atlanta, GA.
Noble Systems Corporation, Maestro 2010.1.1 User Manual, vol. 2, Aug. 3, 2010, 416 pages, Noble Systems Corporation, Atlanta GA 30319.
Noble Systems Corporation, Maestro 2010.1.1 Manual, vol. 3: Reports, Aug. 18, 2010, pp. 1-124, Noble Systems Corporation, Atlanta, GA.
Noble Systems Corporation, Maestro 2010.1.1 User Manual, vol. 1, Aug. 17, 2010, 454 pages, Noble Systems Corporation, Atlanta, GA.

\* cited by examiner

*Primary Examiner* — Ahmad F Matar
*Assistant Examiner* — Jirapon Intavong

(57) ABSTRACT

A call to a wireless number can be originated by a contact center while enforcing various compliance requirements. A dialer and PBX cooperate to originate the call to the wireless number. The dialer selects the next eligible number in the calling list that should be dialed by an agent. Account information provided by the dialer is displayed on the agent's computer, and a call is placed to the agent's phone by the dialer, wherein the call uses the selected number as the ANI. The call is shortly terminated by the dialer, so that it is not answered by the agent. The agent can then redial that number or invoke a callback function to originate the call to the selected number. A PBX handing the call may inform the dialer of the call origination. The dialer may thus monitor the status of the call without actually originating the call.

20 Claims, 6 Drawing Sheets

PROVIDING COMPLIANCE ENFORCEMENT FOR MANUALLY DIALED WIRELESS NUMBERS IN A CONTACT CENTER USING CALLBACK FUNCTIONALITY

RELATED APPLICATIONS

This application incorporates by reference the content of U.S. non-provisional patent application Ser. No. 13/902,130, entitled "Providing Compliance Enforcement for Manually Dialed Wireless Numbers in a Contact Center," filed on May 24, 2013, and the provisional U.S. patent application No. 61/813,713, entitled "Compliance Enforcement for Manually Dialed Wireless Numbers in a Contact Center," which was filed on Apr. 19, 2013.

FIELD OF THE DISCLOSURE

The concepts and technologies disclosed herein generally pertain to enforcement of compliance requirements for calls directed to wireless telephone numbers wherein the calls are originated by agents in a contact center.

BACKGROUND OF THE INVENTION

The Telephone Consumer Protection Act ("TCPA") passed in 1991 regulates, in part, aspects of originating certain types of telephone calls. Specifically, the TCPA statute and Federal Communications Commission's ("FCC") regulations interpreting the TCPA prohibit the use of an "autodialer" to place calls to certain types of telephone numbers (simply referred to as "numbers" herein), including calls to any number "assigned to a paging service, cellular telephone service, specialized mobile radio service, or other radio common carrier service, or any service for which the called party is charged for the call." 47 U.S.C. §227(b) (1) (A); 47 C.F.R. §64.1200(a)(1). This covers what is commonly referred to as a "wireless number" that is assigned to a mobile phone. For simplicity, this term ("wireless number") is used herein to refer to numbers that cannot be called under the TCPA using an autodialer. The term "number" is used herein to refer to a telephone number, which may be wireless or wireline.

The FCC regulates aspects of the TCPA and has considered the scope of the term "autodialer." The TCPA and FCC's rules have defined an "automatic telephone dialing system" ("autodialer") as "equipment which has the capacity (A) to store or produce telephone numbers to be called, using a random or sequential number generator; and (B) to dial such numbers." U.S.C. §227(a) (1). At the time the statute was passed, dialers were frequently configured to originate calls by dialing a random telephone number or dialing telephone numbers in sequence (e.g., 404 555-0000 through 404 555-9999). Hence, the definition of an autodialer incorporated aspects of processing telephone numbers using a random or sequential number generator.

Over time, the FCC has interpreted the scope of an "autodialer" to include equipment that "need only have the capacity to store or produce telephone numbers." (See *Rules and Regulations Implementing the Telephone Consumer Protection Act of 1991*, Report and Order, 18 FCC Rcd. 14014 ¶133 (2003)). Coincident with this time period, predictive dialers were increasingly being used to originate calls to wireline numbers. Predictive dialers can originate calls using a list of numbers to be called with reduced agent waiting time. There is little debate that many predictive dialers do not use "random or sequential number generators." However, the FCC has classified predictive dialers as "autodialers" in certain instances to ensure that the prohibition on autodialed calls was not circumvented by automatically dialing "lists of numbers" instead of creating and dialing 10 digit telephone numbers arbitrarily. The FCC has viewed a basic function of an autodialer as equipment having the "capacity to dial numbers without human intervention." Id. ¶131. Thus, it appears that equipment having the capacity to dial number without human intervention may be an autodialer, regardless of whether such equipment is actually used in such a manner.

As can be expected, it is not always clear whether an equipment configuration is considered an "autodialer." Thus, the problem addressed by the present disclosure is ensuring that compliance related regulations and policies are adhered to while also complying with the mandate that prohibits the use of "autodialers" to call wireless numbers. It is against this backdrop that the concepts and technologies disclosed herein are presented.

SUMMARY

Various embodiments are disclosed related to originating a call to a wireless number while ensuring compliance with various regulations. In one embodiment, a method for originating a call to a number in a contact center includes retrieving a dialing list in a dialer comprising a plurality of numbers to be dialed, determining by the dialer that one of the numbers in the dialing list is a wireless number, originating a first call to an agent by the dialer, receiving the first call by the agent wherein the first call uses a calling party number value set to the wireless number, terminating the first call to the agent by the dialer prior to the agent answering the first call, receiving a second call from the agent at a PBX wherein the second call is directed to the wireless number, and providing a signaling message to the dialer by the PBX in response to receiving the second call.

In another embodiment, a system for providing compliance for wireless calls includes a processor in a dialer configured to process a dialing list comprising a plurality of numbers to be dialed, determine that one of the numbers in the dialing list is a wireless number, originate a first call to an agent, wherein the first call uses a calling party number value set to the wireless number, terminate the first call to the agent by the dialer prior to the agent answering the first call, and receive a signaling message from a PBX indicating receipt by the PBX of a second call from the agent directed to the wireless number.

In another embodiment, a non-transitory computer readable medium includes instructions that when executed by a processor cause the processor to retrieve a dialing list comprising a plurality of numbers to be dialed, determine that one of the numbers in the dialing list is a wireless number, originate a first call to an agent, wherein the first call uses a calling party number value set to the wireless number, terminate the first call to the agent prior to the agent answering the first call, and receive a signaling message from a PBX indicating receipt by the PBX of a second call from the agent directed to the wireless number.

As is discussed in greater detail below, the subject matter disclosed herein may be implemented as a computer-controlled apparatus, a method, a computing system, or as an article of manufacture such as a tangible, non-transitory computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter or detail all embodiments. Furthermore, the claimed subject matter is not limited to implementations that address any or all disadvantages noted in any part of this disclosure.

DETAILED DESCRIPTION

Contact Center Context

Figure 1:
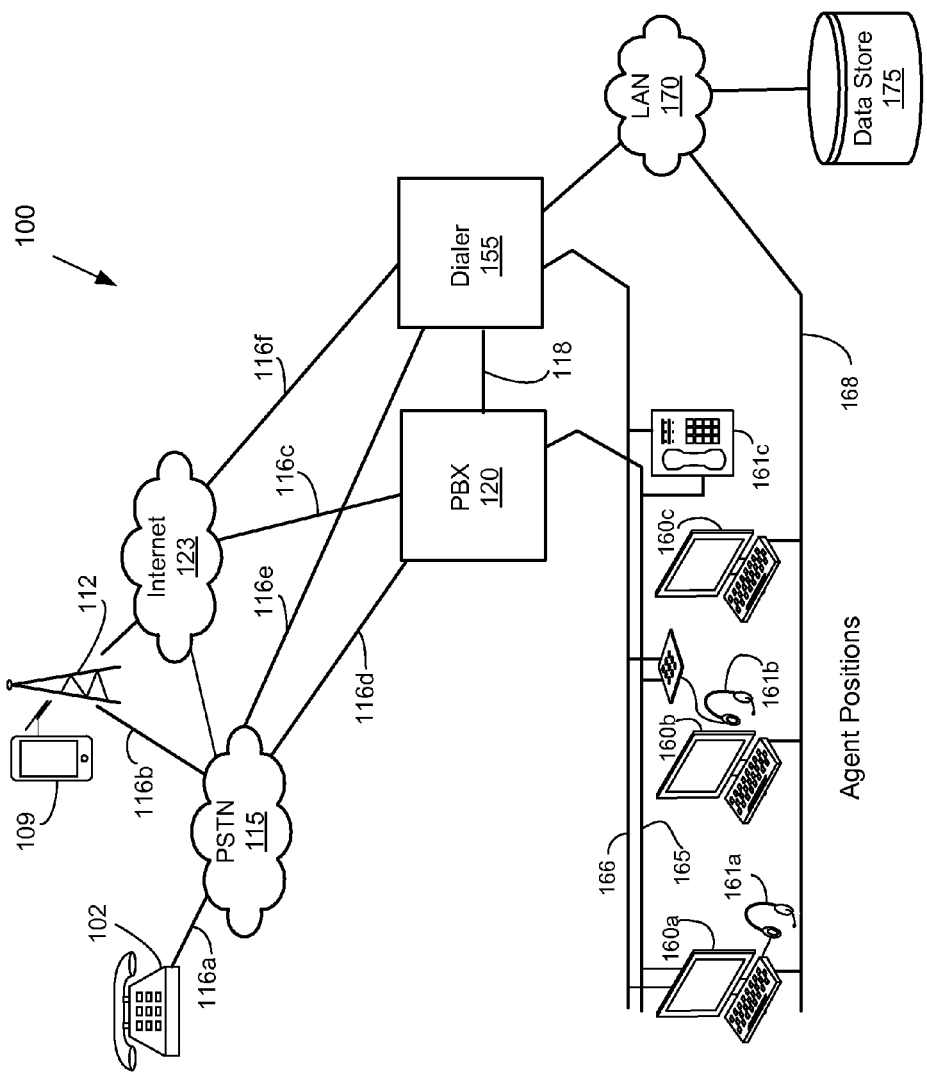
FIG. 1 illustrates one embodiment of a contact center architecture providing compliance enforcement when originating a call to a wireless number.

FIG. 1 shows one embodiment of a contact center architecture 100 for practicing the various concepts and technologies disclosed herein. Although many aspects of contact center operations are disclosed herein in the context of voice calls, the contact center may process other forms of communication such as facsimiles, emails, text messages, video calls, chat messages, and other forms. The term "party" without any further qualification refers to a live person (as opposed to an answering machine or voice mail service) associated with an instance of communication originated by the contact center.

The contact center shown in FIG. 1 may process voice calls that are originated by a dialer 155. As used herein, "dialer" refers to a computerized system originating calls, not a person that manually dials a call. The dialer 155 is typically configured to dial a list of telephone numbers to initiate outbound calls. The list of telephone numbers may be retrieved from a data store 175 that is accessible using a local network 170 into the memory of the dialer. The dialer 155 may directly interface with voice trunks using facilities 116*e* to the PSTN 115 or facilities 116*f* to the Internet 123. After the calls are originated, a transfer or connect operation by the dialer 155 may connect the call with an agent, or more precisely, with an agent's telephone, or place the call in a queue for a next available agent. In the latter case, announcements or music may be provided to the party while they are waiting.

In various embodiments, the dialer 155 may be a predictive dialer that makes use of one or more pacing algorithms to determine how and when to dial a list of numbers so as to minimize the likelihood of a called party being placed in a queue while maintaining effective agent utilization. The dialer 155 may "dial ahead" by originating more calls than there are available agents, expecting that some calls will not be answered by live parties, or that an agent may become available in time. The dialer 155 also ensures that applicable compliance requirements are enforced. While the dialer may be used for dialing wireline numbers, this may not be acceptable for dialing wireless numbers due to various regulatory constraints involving the user of autodialers. The dialer 155 however, is typically configured to ensure all other relevant compliance rules and/or policies are followed when dialing a number, regardless of whether it is a wireline or wireless number.

Outbound voice calls may originate from the contact center to parties using a variety of phone types. A party may receive a call using a conventional analog telephone 102 connected to a public switched telephone network ("PSTN") 115 that uses an analog plain old telephone service ("POTS") line 116*a*. The call may be routed by the dialer 155 to the PSTN 115 and may comprise various types of facilities, including, but not limited to: T1 trunks, SONET based fiber optic networks, ATM networks, PSTN trunks 116*e*. The dialer may also route calls to other networks, such as the Internet 123 using facilities 116*f*.

Voice calls may also be directed to a wireless number at a mobile device 109, such as a smart phone or tablet, which wirelessly communicates with a mobile service provider ("MSP") 112. The voice calls may be routed to the PSTN 115 using an integrated services digital network ("ISDN") interface 116*b* or other types of interfaces that are well known to those skilled in the art. The MSP 112 may also handle calls as packetized voice, referred to herein as voice-over-IP ("VoIP") to an Internet provider 123 using Internet-based protocols. For convenience, unless indicated otherwise, the term "trunk" refers to any type of communication facility providing voice calls to, or from, the contact center, regardless of the type of protocol or technology used. Specifically, a "trunk" as referred to herein is not limited to time-division multiplexing ("TDM") technology. As will be seen, in the case of calls originated by the contact center to a wireless number, a PBX 120 may be used in lieu of the dialer 155.

In the contact center, outbound calls may be connected to an agent by connecting the outbound call portion with a call leg routed over facilities 165 or 166 to agents for servicing. A "call leg" may be defined as a portion or segment of the ultimate end-to-end call. A call leg, at one time, may exist as a call between two endpoints, but is concatenated or bridged with other call legs to create a larger call. For example, a contact center may originate a call from the call handler to an agent, but this call may be considered a call leg in the context of the overall call involving the agent and the remote party. This call leg (from the agent to the call handler) may be connected to another call between the remote party and the call handler, which is also a call leg in the context of the overall call. Once these two call legs are bridged, they create the ultimate call from the agent to the remote party. In some embodiments, facilities 168 may be used. The facilities 165 and 166 may be time division multiplexed ("TDM"), voice over IP ("VoIP"), or any other form used to convey audio data. For purposes of illustration, but not limitation, the facilities 165 for handling voice calls via PBX may be digitized voice in some form of TDM format and the facilities 166 for handling voice calls via the dialer are VoIP based, which may involve session initiated protocol ("SIP") signaling.

After a call is originated by the dialer 155 and a called party answers, the call may be connected with an agent using facilities 166. The physical area at which the agent sits is often referred to as the agent's "position" and these positions are often grouped into clusters that are managed by a supervisor, who may monitor calls and the agents' productivity. An agent usually uses a computing device, such as a computer 160*a*-160*c* and a voice device 161*a*-161*c*. The combination of computer and voice device may be referred to as a "workstation." Thus, the workstation collectively has a data capability and a voice capability, though separate devices may be used in various embodiments. In some instances, "workstation" may be used in reference to specifically either the data or voice capability at the agent's position, as appropriate to the context. For example, "routing the call to the agent's workstation" means routing a call to one of the voice devices 161a-161c at the agent's position. Similarly, "routing the call to the agent" means routing a call to the appropriate equipment at an agent's position.

The voice device used by an agent may be a "soft phone" device exemplified by a headset 161a connected to the computer 160a. The soft phone may be a virtual telephone implemented in part by an application program executing in a computer. The phone may also comprise an Internet Protocol ("IP") based headset 161b or a conventional phone 161c. Use of the term "phone" is intended to encompass all these types of voice devices used by an agent, regardless of technology, unless indicated otherwise. In some embodiments, the voice traffic to the soft phone may be transmitted using the same facilities 168 used to convey data to the agent's workstation computer. In other embodiments, voice may be conveyed on separate facilities 165 or 166. In other embodiments, the agents may have two phones, one phone which uses facilities 165 to communicate with the PBX and another phone that uses facilities 166 to communicate with the dialer.

After completing a call, the dialer 155 may generate call data that is stored in a record in the data store 175. The data store may include a database. The call record may comprise data that indicates the progress and status of the call. The call record data may indicate the time the call was originated, the number dialed, the call disposition, when the call was answered, whether an answering machine was encountered, etc. In some embodiments, call recording of the audio data of the call may also be stored in the data store 175 or in a memory store under control of the dialer.

The contact center may also incorporate a private branch exchange ("PBX") 120. This may be embodied as a TDM or VoIP based switching device for handling voice calls as well as incorporating other capabilities. Other embodiments may use a private automatic branch exchange ("PABX"), Internet-Protocol-PBX ("IP-PBX"), or other switching device. The term "PBX" as used herein is intended to encompass these and other variations. The PBX 120 may allow agents to use their phones 161a-161c to directly originate and/or receive calls to other agents or parties using facilities 116d, as well as originate or receive "outside" calls via facilities 123 to the PSTN or facilities 116c, local network 170, and 116c to the Internet 123. Various topologies and configurations are possible as to how the PBX may provide access to other parties. For example, the PBX may have facilities to the LAN 170, where voice data may be routed to agent's phones 161a using facilities 168.

Specifically, an agent may dial a number to place a call to a wireless number associated with a wireless device 109 using a conventional, VoIP, or ISDN phone 161a-c using facility 165 via PBX 120, which then uses facilities 116d or 116c. In some embodiments (not shown), the agent may dial the number to place the call via phone 161a using facilities 168 and LAN 170, which is connected to the PBX (not shown), and the call then proceeds to the remote party.

Normally, agents may communicate using a phone via either a PBX or a dialer in a contact center, but not with both at the same time. The PBX and dialer are typically configured so that each can complete their respective call processing functions (for either incoming or outgoing calls as may be appropriate) in a stand-alone configuration, without requiring cooperation with each other to complete a call. Thus, the dialer may be used for predictive dialed calls and the PBX can be used for conventional dialed calls.

The facility 118 interconnecting the PBX 120 and the dialer 155 may be used to convey signaling information and/or a call leg associated with a call originated by the agent via the PBX. This also can be used to facilitate the dialer 155 recording portions of the call, as will be seen below.

The architecture shown in FIG. 1 illustrates one possibility of the context in which the principles and technologies presented herein may apply and does not limit the application of other architectures. Further, not all aspects and components shown in FIG. 1 are required in all embodiments. Thus, a contact center may have agent positions using only a workstation configuration 160a, 161a involving soft phones, whereas other contact centers may use other configurations. In some configurations, the phones may be capable of handling two types of facilities (e.g., facilities 166 and 165). Specifically, the phones may have the capability of handling a dialer originated call on one facility 166 and a manually originated call via the PBX on another facility 165. In other embodiments, two phones may be present at each agent's workstation. Those skilled in art will recognize FIG. 1 represents one possible configuration of a contact center architecture 100, and that variations are possible with respect to the protocols, configurations, facilities, technologies, and equipment used.

The above components may be variously referred to as a "computer," "processing device," "unit," "component," or "system" and may incorporate therein a local data store or database, or interface with an external database. Use of the word "server" herein does not require the component to interact in a client-server arrangement using web-based protocols with other components, although that may be the case. Further, the above components may be located remotely from (or co-located with) other components. For example, the dialer 155 and PBX 120 may be co-located in a contact center. Furthermore, one or more of the components may be implemented on a single processing device or platform to perform the functions described herein.

In addition, the contact center architecture 100 may be provided as a hosted solution, where the call processing functionality is provided as a communication service (a so-called "communication-as-a-service" or "CaaS") to a contact center operator. Thus, there is no requirement that the components identified above must be actually located or controlled by a contact center operator.

In addition, the agent positions can be co-located in a single physical contact center or in multiple physical contact centers. The agents can be remotely located from the other components of the contact center, and may also be remotely located from each other, sometimes referred to as a "virtual contact center." A virtual contact center may describe a scenario where agents work at home, using their own computers and telephones as workstations. In some configurations, a single physical location of the contact center may not be readily identifiable. This may occur when the call processing functions are provided as a service in a hosted cloud computing environment and the agent positions are in their individual residences.

Message Flow

In FIG. 1, agents communicating with a call originated by the contact center call may be connected by the dialer using facility 166. Specifically, the dialer originates wireline number calls using facilities 116e and/or 116f, and then connects the first answered call to an available agent using facilities

166. Separately, agents may also originate an outbound call directly to a remote party, such as directed to a wireless number, by using facilities 165 via the PBX 120. In this case using the PBX, the call is originated by the agent manually dialing the number. In some embodiments, agents may have two phones in their workspace for these two separate types of calls. For example, an agent may have a 'soft phone' and a conventional telephone. Outbound predictive dialed calls by the dialer 155 to wireline numbers may involve using the agent's soft phone and other outbound calls to wireless numbers originated by the agent via the PBX may use a conventional phone used by the agent. In other embodiments, a single phone device may be used, but which can communicate using either facility 165 or 166 depending on the type of call, or the single phone may have multiple lines that are used for the different types of calls. In some embodiments, a single facility (e.g., a LAN type facility) can be used allowing the phone to communicate either with the PBX or dialer using the single common facility.

When originating a call via the PBX by manually dialing, the agent controls call origination. While this provides flexibility as to when and which number the agent can dial, it provides a risk in that the agent may dial an improper number or at an improper time. Thus, manual dialing is susceptible to the agent dialing a number that should not be contacted or at the wrong time. While dialing a wireless number in this manner avoids using an autodialer, it runs the risk of not complying with other regulations. Various conditions that have to be met are described in the aforementioned patent applications, which are incorporated by reference. Even if the agent is currently dialing a wireless number that is allowed to be called, the very dialing of that wireless number may result in another agent dialing that same number shortly thereafter as being improper. Therefore, dialing of numbers (whether wireline or wireless) for calling campaigns should be coordinated across the set of agents. Thus, it becomes apparent why manual dialing is susceptible in causing non-compliant calls.

Figure 2:
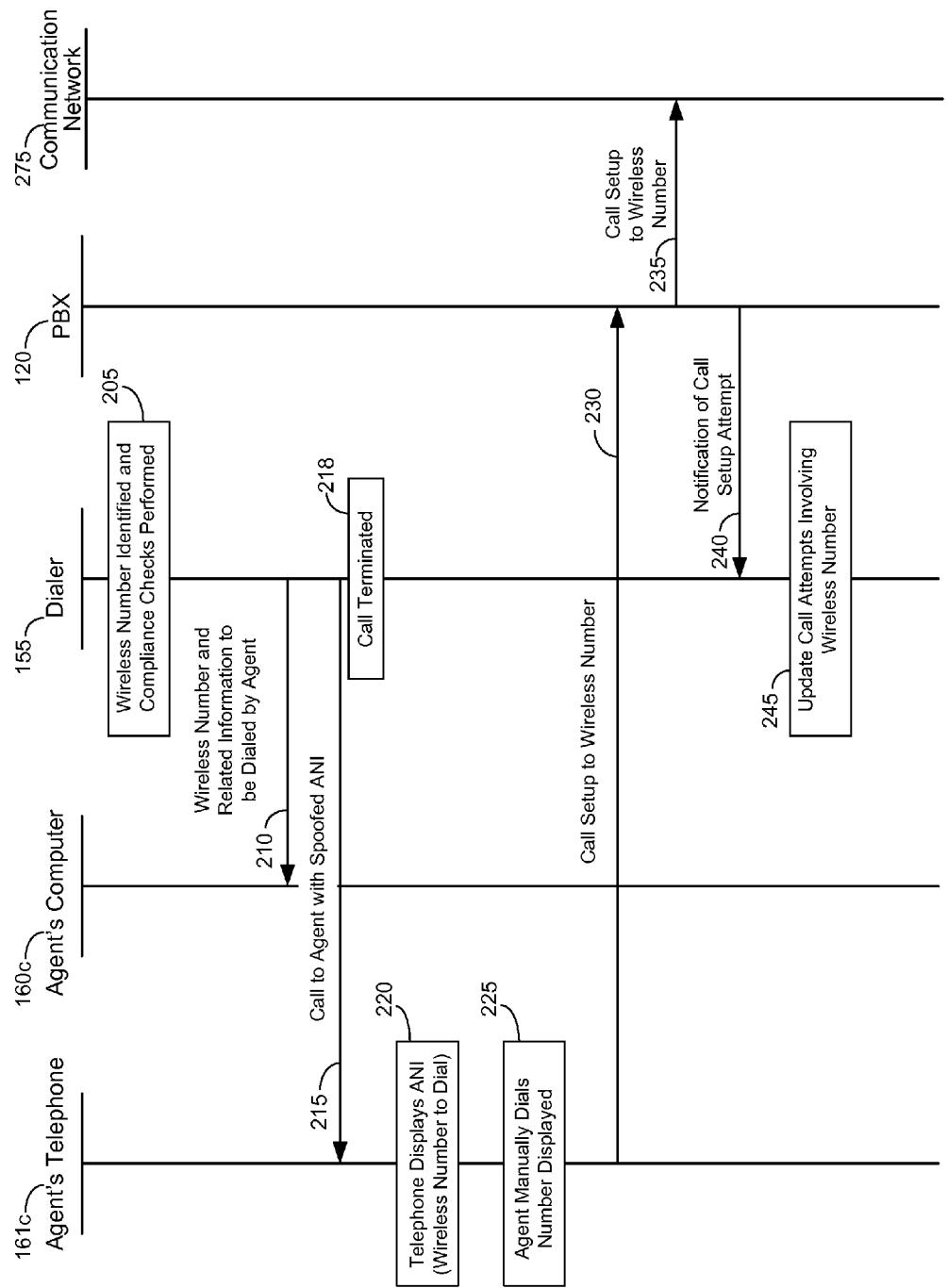
FIG. 2 illustrates a messaging flow associated with the architecture of FIG. 1, for originating a call to a wireless number according to one embodiment of the invention.

FIG. 2 illustrates a messaging diagram that uses the architecture of FIG. 1 to assist the agent in originating wireless calls, so that a particular number dialed by the agent conforms to various applicable regulations and policies. In essence, the agent can dial the number while relying on the dialer 155 to perform compliance checking.

Turning to FIG. 2, the process involves the dialer 155 processing a list of numbers to select an eligible number in the dialing list to dial that is compliant with the various regulations and policies associated with the campaign. This is as shown in operation 205.

The dialer may select an agent and send information about the number the agent should dial including e.g., account information, to the selected agent's computer. This information may include account information, name, number, etc. This step is optional, and is shown in message 210. For sake of illustration, it is assumed that the information is sent to computer 160*c*. The information provides a visual indication to the agent of the next call that should be originated. The information presented to the agent also reflects that the number has been processed for compliance purposes and originating a call to that number will be a compliant call. Thus, a call to this number meets the calling window requirements, does not exceed a number of call attempts, etc.

Next, the dialer originates a call to the agent's telephone 161*c*. Normally, the dialer 155 originates such a call to the selected number. However, the dialer is modified to instead place a call to the selected agent's phone in operation 215 based on the selected number in the dialing list (a.k.a. as calling list) being a wireless number. Furthermore, the dialer is further modified so as to set the calling party number, also known as ANI (automatic number identification), to the value of the selected number. To summarize, the dialer originates a call wherein the called number is the agent's station number and the calling number is set to the selected number from the dialing list. In another embodiment, the dialer generates the call to the wireless number to the PBX (with an ANI value set to a default value), and the PBX then in response initiates a call or forwards the call to the agent by essentially replacing the ANI with the value of the wireless number. Thus, the functionality of replacing the ANI is performed by the PBX, not the dialer.

Because the calling number or ANI is that of the selected party and does not reflect an incoming call from that party, the ANI is said to be "spoofed." A spoofed ANI is an ANI that does not reflect the actual number of the calling party. Thus, the agent's phone receives a spoofed call from the dialer appearing to be an incoming call from that party. The ANI is considered to be spoofed because the dialer has originated the call, not the user corresponding to the selected wireless number. As noted above, the spoofing may be performed by the dialer when the dialer establishes the call to the agent, or the spoofing may be performed by the PBX (assuming the call from the dialer is handled by the PBX).

In some embodiments the agent's phone may be configured to provide a shortened or distinctive form of ringing. This informs the agent that the call is not to be answered, that the call is simply an indication of the number of the selected party that was selected by the dialer. Further, the dialer may quickly disconnect the call in operation 218, so that the agent's phone may ring only once or briefly. In various embodiments, the dialer should terminate the call within a few seconds after call origination. Preferably, the call is terminated within a second after a confirmation is received that the call was offered to the agent. This confirmation may be provided by the signaling protocol used to establish the call, such as a SIP or ISDN protocol. In other embodiments, a timer may be started after the call is established to the agent, and upon expiry of the timer, the call is then terminated. This timer will typically be set less than a few seconds. The value of this timer is important in that if the call rings too long, the agent may answer the call, which may lead to inefficient operation of the contact center.

The phone may be configured to store the ANI of this call (which corresponds to the selected wireless number) in a memory register and display the number to the agent in operation 220. The phone may incorporate a small display to display telephone numbers, and such display capabilities are well known. Thus, the dialer attempts to originate a call, which may not be answered and only last in the range of a fraction of a second to a few seconds at the most, in order to communicate the selected telephone number to the agent so that the agent's phone can display the number.

At this point, the agent is aware of the incoming call and may view the selected number that is displayed by the phone 161*c*. The agent may be further aware that this is not actually an incoming call to be answered based on the abbreviated ringing. Further, separately, the agent may also see the selected number (e.g., the spoofed ANI) displayed on the computer 160*c* display, which also provides an indication of the wireless number to be dialed. That is, the dialer provides the selected wireless number and account information to the agent's computer and then provides an abbreviated call attempt to the agent's phone using the selected wireless number as the ANI for that call.

Next, the agent manually dials the indicated number using the phone 161*c*. This may in operation 225 be accomplished in various ways. First, the agent may invoke a "last-incoming-number-callback" function in the phone, which will originate a call based on the last ANI value received. In other embodiments, the agent may visually look at the phone's display or the computer display, and manually enter the number into the phone by conventionally pressing keys. Depending on the phone technology, the agent may be required to press a "send" button after dialing the numbers. In another embodiment, the agent may invoke a function causing the PBX to invoke the callback.

Assuming the agent manually presses the keys on the phone to manually dial the wireless number, the telephone 161c originates a call to the PBX 120 over facility 165 indicating the selected wireless number in operation 230. In turn, the PBX originates the call through the communication network 275 shown in message 235. The communication network 275 may be the PSTN 115, Internet 123, private network, etc. This results in a call established to the selected wireless number.

Shortly after (or contemporaneously), the PBX 120 provides a message to the dialer 155 that a call was originated by the agent to the selected number in message 240. Thus, the dialer is now aware that the PBX has handled a call to the selected number and can now properly reflect the call attempt in its call records in operation 245. In other embodiments, the PBX may also subsequently report the status of the call attempt, e.g., indications of whether the call was answered, whether it encountered a busy signal, etc. This messaging is not shown in FIG. 2.

To recap, the dialer has informed the agent via the computer and their telephone of a selected number to dial, but the dialer has not originated any call. The agent manually dials the call to the selected number via the PBX, and the PBX informs the dialer of the attempt. Thus, the dialer is aware of what number should have been dialed, what number was actually dialed, as well as the outcome of the call attempt. Consequently, although the dialer did not originate the call, it is able to ensure that the call that was selected to be dialed by the agent conform to the various regulations and policies for that campaign.

When the call is terminated, in one embodiment the agent may disposition the call to the dialer using the computer workstation. In another embodiment, the agent's may press the keys of the phone, thereby causing dual-tone multiple frequency ("DTMF") to be generated. The DTMF tones can be recognized as a particular disposition code. Dispositioning a call refers to entering a code (the disposition code) that informs the dialer as to the outcome of the call. Further, entry of a disposition code further informs the dialer that the call is terminated. In other embodiments, the PBX may also provide a signaling message to the dialer indicating the call is terminated. Typically, the dispositioning of the call by the agent occurs after the agent has completed any after-call work.

Once the dialer knows that the call has terminated, the dialer can then return to operation 205 and select the next number that is eligible for dialing by the agent. The process then repeats. The agent typically will not disposition the terminated call until the agent is ready to process another call.

Figure 3:
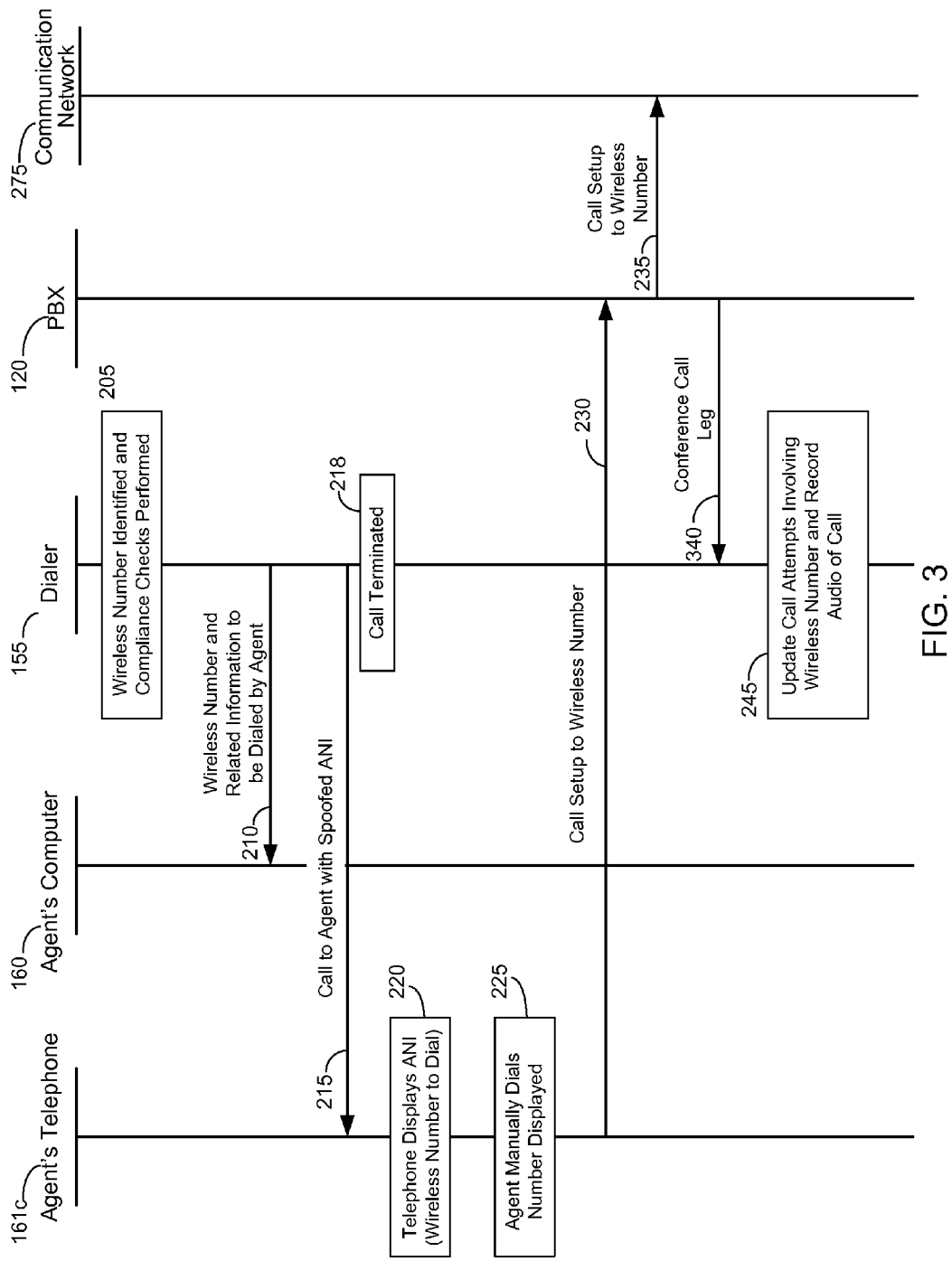
FIG. 3 illustrates another messaging flow associated with the architecture of FIG. 1, for originating a call to a wireless number according to one embodiment of the invention wherein the audio of the call is recorded.

In some circumstances, it is desirable for the contact center to record the call. The architecture shown in FIG. 1 can be accommodated to perform call recording as well. This is reflected in the message diagram of FIG. 3, which is similar to FIG. 2. In FIG. 3, the differences involve the PBX 120 responding to the call setup of message 230 by not only originating the call to the wireless number in message 235, but also establishing a call leg, e.g., by bridging on the dialer to the call, via message 340. This may be done just before, simultaneously, or just after establishing the call to the wireless number. Preferably, this is done quickly so that that any in-band progress tones associated with the call to the wireless number may be detected by the dialer. This is in lieu of, or in addition to, the signaling message 240 of FIG. 2. In this case, the call leg may also indicate a spoofed ANI to the dialer, where the ANI is the value of the selected number. The dialer then knows that a call was originated by the PBX to the selected number and knows that the call leg is associated with the wireless number. In summary, the PBX may automatically conference in another entity, such as the dialer, that records the call or causes the call to be recorded. Although that entity is disclosed as the dialer, it could be a recording system or some other system in the contact center.

The dialer 155 may be configured to have started a timer after sending message 210 or 215, reflecting that the dialer is expecting a call leg to be received for that number. Once the call leg is accepted, the dialer can then record the progress and audio of the call in a recording system (not shown). If the timer expires without the dialer receiving the conferenced call leg, then the dialer may presume the call was never established. Thus, the dialer knows that a call was never attempted to the selected number. This timer can be implemented in conjunction with FIG. 2, wherein the timer is stopped upon receiving the signaling message from the PBX. In this way, the dialer is able to detect if the call was never attempted.

Component Process Flows

PBX

Figure 4:
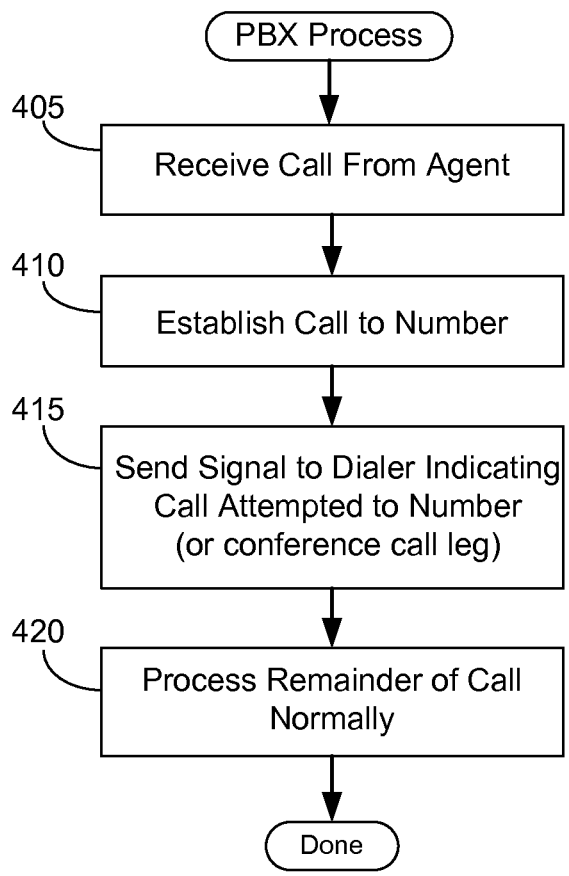
FIG. 4 illustrates one process flow for a PBX used by the agent to originate a call to a wireless number according to one embodiment of the invention.

Turning to FIG. 4, a process flow is shown that is associated with the PBX in processing calls to a wireless number by the agent. The process begins with receiving a call setup from the agent indicating the selected number in operation 405. Specifically, the called party number is the same value that the dialer selected for the call that was briefly established to the agent' phone. The PBX may not be aware whether the agent manually dialed the number or invoked a last-number-redial capability in the phone. In some embodiments, the agent could request that the PBX redial the number of the last incoming call.

The PBX, in response, establishes the call to the wireless number in operation 410 as per conventional procedures. Next, the PBX may send a signal or other indication to the dialer that a call is being established to the number in operation 415. This may be a signaling message. In other embodiments, such as if call recording is desired, establishment of a conferenced call leg may occur. This indication may be sent before, simultaneously, or just after the call to the wireless number. The signaling message may merely indicate that a call was attempted and may not indicate the status of the call. In other embodiments, the signal may be sent after the status of the call is known and thus, is able to indicate a status (e.g., busy, no answer, answered). In other embodiments, a supplemental message(s) could be sent to the dialer informing of the status of the call. Next, in operation 420 the remainder of the call is processed as normal.

In summary, in one embodiment the PBX is modified to convey a signaling message to the dialer indicating the call attempt. The PBX is not required to implement any timers with respect to the signaling message, and beyond a possible acknowledgement of receipt of the message from the dialer, the PBX may not expect or require any form of response from the dialer.

Dialer

Figure 5:
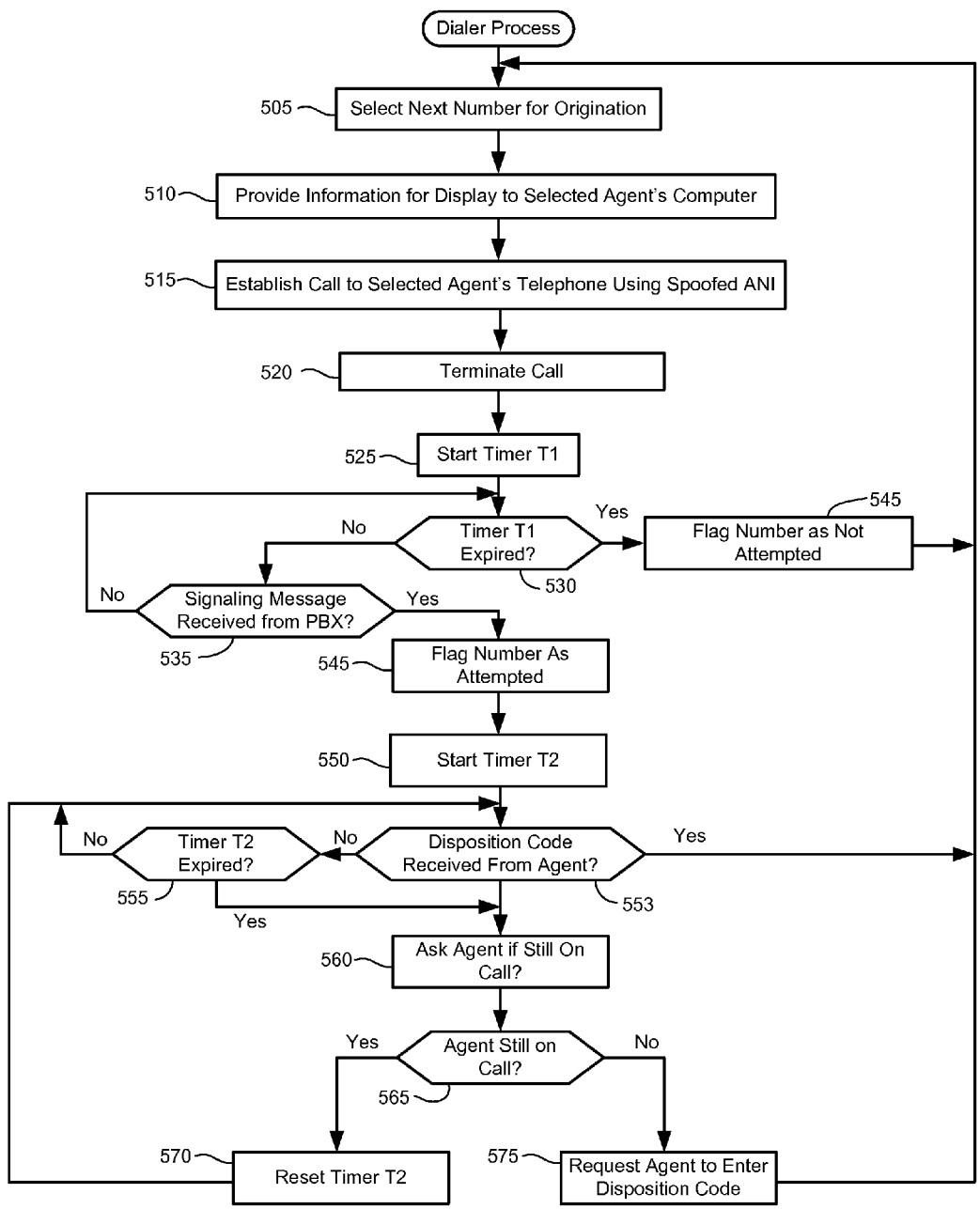
FIG. 5 illustrates one process flow for a dialer associated with the agent originating a call to a wireless number according to one embodiment of the invention.

Turning to FIG. 5, a process flow for the dialer is shown. The process flow modifies the conventional processing of the dialer for making for outbound calls. In one embodiment, numbers in the calling list indicated as being wireless numbers are provided the treatment shown in FIG. 5, whereas wireline numbers are predictively dialed as normal. Thus, the process flow in FIG. 5 applies at least to wireless numbers. In other embodiments, both wireless and wireline numbers may be manually dialed as described herein.

The process begins with the dialer examining the calling list to select the next number for call origination in operation 505. This requires that all applicable regulatory and policy compliance requirements are reviewed to ensure that the number can be manually called. For example, the calling window requirements need to be met, so that the call does not originate to the remote party too early or too late. The number may also be checked to ensure it is not on a do-not-call list. Other checks may ensure that the number was not just dialed, resulting in too frequently calls to that number. Further, other checks may be required—e.g., if the campaign is for debt collection, the party may have just paid their account or had just been contacted by another agent, and thus the number should not be called.

Next, the dialer provides the appropriate account information for display on the agent's computer in operation 510. The information presented will vary from campaign to campaign, and may involve presenting the called party's name, account history, etc. Then, the dialer is configured to call the selected agent using an ANI that is set to the selected number in operation 515. In short, the call to the agent uses a spoofed ANI. The purpose of the call is to provide the ANI to the agent's phone, where it may be stored and displayed. The call may also provide an audible ringing indication to the agent, which lets the agent know that another outbound call can be dialed by the agent using the spoofed ANI. Because the purpose of the call is primarily to provide the ANI to the agent's phone, the dialer then almost immediately terminates the call in operation 520. Thus, there is no expectation that this call will be answered by the agent.

The dialer may start a timer in operation 525 that signals the beginning of a time period in which the dialer expects the agent to originate the call to the selected number. This timer is cancelled when the PBX signals to the dialer that the call was established. If the timer does expire in operation 530, i.e., the PBX signal is not received, then the dialer presumes that the agent did not attempt the call and the dialer flags the number as not attempted in operation 545. Thus, the dialer knows that that this number may be reattempted. If the timer T1 has not expired in operation 530, then another test in operation 535 determines whether a signaling message was received from the PBX. If not, the process loops back to operation 530. If a signaling message was received in operation 535, then timer T1 is stopped, and the number is flagged as having been attempted in operation 545.

Next, the dialer may start another timer, T2 in operation 550. This timer waits for the entry of a disposition code from the agent, indicating the status of the call. Since the call was attempted, it is appropriate for the agent to indicate what happened by entering a disposition code after the call in operation 553. If the disposition code was received, then the dialer knows that the call was completed, and the process loops back to operation 505 for processing the next eligible number. In other embodiments, the PBX may send a signal informing the dialer when the call is terminated. In other embodiment, the dialer may determine the status of the call by using in-band audio tones that are indicated over the conferenced call leg between the PBX and the dialer.

If the disposition code is not received in operation 553, then one of two conditions may exist. First the agent may still be on the call, and hence the call is not ready to be dispositioned or the agent has forgotten to disposition the call. Thus, the second timer T2 is checked for expiry in operation 555. If it has not expired, then the process loops back to operation 553, where the process continues checking. Once the timer T2 has expired in operation 555, the dialer prompts the agent by sending a message to the agent's computer asking whether the agent is still on the call in operation 560. In other embodiments, the dialer may query the PBX. If the agent responds in operation 565 that the agent is still on the call, then in operation 570 timer T2 is reset and the process loops back to operation 553. If the agent responds by indicating they are not on the call (e.g., the call has completed), then the dialer in operation 575 requests the agent to enter the disposition code. Once completed, the process may loop back to operation 505 and select the next eligible number.

The dialer may maintain state information associated with each number that it processes. The states may reflect whether the dialer has provided any account information to the agent, whether any signaling indication has been received from the PBX indicating that the call is active, and whether any disposition code was received indicating the call has terminated. This allows the dialer to shadow the call state of the call, even though the dialer is not directly handling the call.

Exemplary Processing Device Architecture

Figure 6:
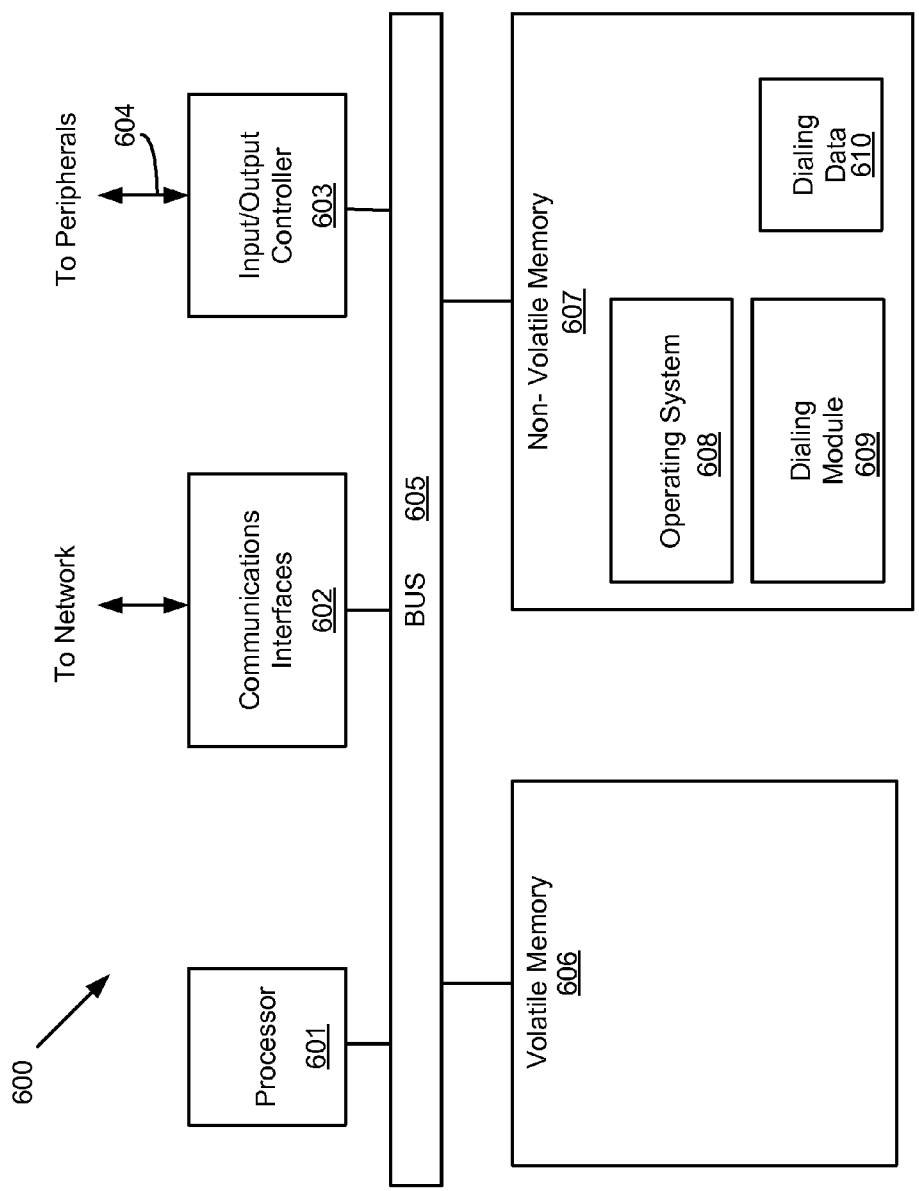
FIG. 6 illustrates one embodiment of an architecture of a PBX, dialer, or other component used to embody the concepts and technologies disclosed herein.

FIG. 6 is an exemplary schematic diagram of a processing system 600 that may be used in an embodiment to practice the technologies disclosed herein, such as the PBX 120 or the dialer 155. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 6, the processing system 600 may include one or more processors 601 that may communicate with other elements within the processing system 600 via a bus 605. The processor 601 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 600 may also include one or more communications interfaces 602 for communicating data via the local network with various external devices. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 603 may also communicate with one or more input devices or peripherals using an interface 604, such as, but not limited to: a keyboard, a mouse, a touch screen/display input, microphone, pointing device, etc. The input/output controller 603 may also communicate with output devices or peripherals, such as displays, printers, speakers, headsets, banner displays, etc.

The processor 601 may be configured to execute instructions stored in volatile memory 606, non-volatile memory 607, or other forms of computer-readable storage media accessible to the processor 601. The volatile memory 606 may comprise various types of memory technologies, including, but not limited to: random access memory ("RAM"), dynamic random access memory ("DRAM"), static random access memory ("SRAM"), and other forms well known to those skilled in the art. The non-volatile memory 607 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 607 may store program code and data, which also may be loaded into the volatile memory 606 at execution time. Specifically, the non-volatile memory 607 may store one or more computer program modules, such as a dialing module 609 containing instructions for performing the process and/or functions associated with the technologies disclosed herein, and related data 610, and/or operating system code 608. In addition, the dialing module 609 may generate or access the data 610 in the non-volatile memory 607, as well as in the volatile memory 606. The volatile memory 606 and/or non-volatile memory 607 may be used to store other information including, but not limited to: records, applications, programs, scripts, source code, object code, byte code, compiled code, interpreted code, machine code, executable instructions, or the like. These may be executed or processed by, for example, the processor 601. These may form a part of, or may interact with, the dialing module 609 and/or data 610.

The technologies described herein may be implemented in various ways, including as computer program products comprising memory storing instructions causing a processor to perform the operations associated with the above technologies. The computer program product comprises a tangible, non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such tangible, non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-re-writable ("CD-RW"), digital versatile disc ("DVD"), Blu-Ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for originating a call in a contact center comprising a private branch exchange ("PBX") to a wireless number, comprising:
   retrieving a dialing list in a dialer comprising a plurality of numbers to be dialed;
   determining by the dialer that one of the numbers in the dialing list is the wireless number;
   originating a first call by the dialer to a telephone used by an agent;
   receiving the first call at the telephone by the agent, wherein the first call has a calling party number value equal to the wireless number;
   terminating the first call to the telephone by the dialer prior to the agent answering the first call;
   presenting the wireless number to the agent;
   receiving a second call from the telephone at the PBX, wherein the second call is directed to the wireless number; and
   providing a signaling message to the dialer by the PBX in response to receiving the second call indicating the second call originated from the telephone to the PBX.

2. The method of claim 1, wherein the dialer is a predictive dialer, and further comprising:
   determining a second one of the numbers in the dialing list is a wireline number; and
   originating a third call to the wireline number by the predictive dialer.

3. The method of claim 1, wherein the signaling message to the dialer by the PBX conveys the wireless number present in the first call.

4. The method of claim 3, wherein the signaling message is associated with establishment of a conference call leg between the PBX and a memory store, and the dialer is configured to cause audio of the conference call leg to be recorded in the memory store.

5. The method of claim 1, wherein the telephone used by the agent is configured to display the calling party number value.

6. The method of claim 5, wherein the agent originates the second call by manually dialing digits indicating the calling party number value.

7. The method of claim 6, wherein the dialer is configured to present account information associated with the wireless number for display on a computer used by the agent.

8. The method of claim 1, wherein the agent provides a disposition code to the dialer.

9. A non-transitory computer readable medium comprising instructions that when executed by a processor cause the processor to:
   retrieve a dialing list comprising a plurality of numbers to be dialed;
   determine that one of the numbers in the dialing list is a wireless number;
   originate a first call to telephone used by an agent, wherein the first call uses a calling party number value set to the wireless number;
   terminate the first call to the telephone prior to the agent answering the first call; and
   receive a signaling message from a private branch exchange ("PBX") in a contact center indicating receipt by the PBX of a second call from the telephone directed to the wireless number.

10. The non-transitory computer readable medium of claim 9, wherein the instructions further cause the processor to:
    determine a second one of the numbers in the dialing list is a wireline number; and
    originate a third call to the wireline number.

11. The non-transitory computer readable medium of claim 9, wherein the signaling message from the PBX indicates the calling party number value as the calling party number.

12. The non-transitory computer readable medium of claim 9, wherein the instructions further cause the processor to:
    receive a call leg associated with the second call; and
    record audio received on the call leg.

13. The non-transitory computer readable medium of claim 9, wherein the instructions further cause the processor to:
    retrieve account information associated with the wireless number; and
    provide the account information to a computer used by the agent for displaying the account information to the agent.

14. The non-transitory computer readable medium of claim 9, wherein the instructions further cause the processor to:
    receive a disposition code from the agent; and
    store the disposition code in a record in association with the wireless number.

15. A non-transitory computer readable medium comprising instructions that when executed by a processor in a private branch exchange ("PBX") in a contact center cause the processor to:
    process a call request from a telephone used by an agent, the call directed to a wireless number; and
    provide a signaling message to a dialer co-located in the contact center in response to receiving the call request from an agent.

16. A system for providing compliance for wireless calls, comprising:
    a processor in a dialer configured to:
        process a dialing list comprising a plurality of numbers to be dialed;
        determine that one of the numbers in the dialing list is a wireless number;
        originate a first call to a telephone used by an agent, wherein the first call uses a calling party number value set to the wireless number;
        terminate the first call to the telephone by the dialer prior to the agent answering the first call; and
        receive a signaling message from a private branch exchange ("PBX") indicating receipt by the PBX of a second call from the agent directed to the wireless number.

17. The system of claim 16, wherein the processor is further configured to:
    determine a second one of the numbers in the dialing list is a wireline number;
    originate a third call to the wireline number; and
    connect the third call to telephone used by the agent.

18. The system of claim 16, wherein the processor is further configured to:
    retrieve account information associated with the wireless number; and
    provide the account information to a computer used by the agent for displaying the account information to the agent prior to originating the first call to the agent.

19. The system of claim 16, wherein the processor is further configured to:
    receive a call leg associated with the second call; and
    record audio received on the call leg.

20. The system of claim 16, wherein the processor is further configured to:
    receive a disposition code from the agent; and
    store the disposition code in a record in association with the wireless number.

* * * * *